United States Patent

Raney

Patent Number: 5,165,562
Date of Patent: Nov. 24, 1992

[54] ANTI-SPLASH PAINT CAN COVER

[76] Inventor: Robert J. Raney, RFD 11, Box 37, Loudon, N.H. 03301

[21] Appl. No.: 674,774

[22] Filed: Mar. 25, 1991

[51] Int. Cl.⁵ .................................................. B65D 25/00
[52] U.S. Cl. .................................... 220/307; 220/307; 220/354
[58] Field of Search ................. 220/90, 354, 240, 356, 220/307, 306, 355; 215/270, 354, 320

[56] References Cited

U.S. PATENT DOCUMENTS

| | | | |
|---|---|---|---|
| 3,568,871 | 3/1971 | Livingstone | 215/354 X |
| 3,945,527 | 3/1976 | Pylant | 220/90 |
| 4,125,210 | 11/1978 | Embree | 220/570 |
| 4,279,358 | 7/1981 | Jacobs | 220/354 X |
| 4,298,134 | 11/1981 | Lewis, Jr. | 220/354 X |
| 4,312,459 | 1/1982 | Leach | 220/256 |
| 4,387,828 | 6/1983 | Yates | 220/284 |
| 4,388,998 | 6/1983 | Unerwood et al. | 220/307 |
| 4,531,650 | 7/1985 | Friendship | 215/270 X |
| 4,880,131 | 11/1989 | Gallagher et al. | 220/83 |
| 4,936,482 | 6/1990 | Gallagher et al. | 220/83 |
| 4,955,500 | 9/1990 | Rhoads | 220/90 X |
| 4,969,570 | 11/1990 | Harvey, Sr. | 220/90 |

*Primary Examiner*—Stephen Marcus
*Assistant Examiner*—Paul A. Schwarz
*Attorney, Agent, or Firm*—William B. Ritchie

[57] ABSTRACT

Anti-splash paint cover for use on standard paint cans that reseal the paint can without causing paint which has collected in the paint sealing rim to splash or coat the sides of the can during the recovering process. The invention is a molded urethane plastic cover that can be installed or removed without the use of tools. The cover fits tightly by creating a slightly negative pressure within the can. The cover is easily reusable as the paint adhering to the inside cover can be left to dry, after which the cover is merely twisted to cause the paint to flake off.

13 Claims, 2 Drawing Sheets

ANTI-SPLASH PAINT CAN COVER

BACKGROUND OF THE INVENTION

1. Field of the Invention

The invention relates to anti-splash cover for resealing standard paint cans.

2. Description of the Related Art

The problem of resealing the standard paint can without having the paint run down the sides of the can or, even worse, splashing out of the rim to stain the surrounding area is well documented. The problem is further exacerbated by the fact that the paint remaining in the paint can annular ring will harden which causes each subsequent cover removal and resealing to be more difficult and more likely to result in spillage. Eventually after several re-closings, most paint cans are virtually non-resealable with paint covering the sides of the can. Due to the inability to reseal tightly, the remaining paint within the can is destined to harden and be wasted.

Several approaches to solving this problem have been attempted. First, attempts have been made to redesign the paint can and its cover. Such solutions have not been able to cost effectively compete with the standard paint can and cover so that the metal can and cover remains the choice for all paint manufacturers.

Representative of this genre is U.S. Pat. Nos. 4,880,131; 4,936,482, issued to Gallaher et al. These references disclose a ringless lid design and a paint can having a specially tapered shaped wall section to receive the cover. Also, U.S. Pat. No. 4,388,998, issued to Underwood, discloses a container and lid having a series of longitudinally and radially reversely inclined inter-engaging sealing elements. Still another attempted solution is disclosed in U.S. Pat. No. 4,387,828, issued to Yates, in which a plastic container and lid is described.

The other approach has been to design a resealable lid for the standard paint can. U.S. Pat. No. 4,312,459, issued to Leach, discloses a rim cover and lid combination for use with standard paint cans. The two-part structure has a rim cover that prevents paint from reaching the offending paint can annular ring and sealing groove. Then the second part of the apparatus attaches over the rim cover. The two-part approach results in extra manufacturing costs and inconvenience.

U.S. Pat. No. 4,125,210, issued to Embree, discloses another two part approach to this problem. This reference describes a rim cover capable of holding a brush and a cover member which closes off the can when not in use.

A easily resealable cover that can be installed or removed without the use of tools, such as screwdriver, claw hammer, etc. and will not splash paint during the resealing procedure and be produced economically is not found in the prior art.

SUMMARY OF THE INVENTION

It is an object of the invention to provide a cover for resealing standard paint cans that will tightly seal the can so that the contained paint will not dry out.

It is another object of the invention to provide a cover for standard paint cans that can be installed and removed without the use of tools, such as a hammer or a screw driver.

It is still another object of the invention to provide a cover for standard paint cans that can be effortlessly cleaned for re-use on another can by merely twisting the cover so that dried paint will flake off.

It is still another object of the invention to provide a cover for standard paint cans that be easily stored on the wall.

It is still another object of the invention to provide a cover for standard paint cans that is sealed tightly so that if the paint can is tipped over, paint will not be spilled, yet be easily removed when desired.

Most importantly, the final object of the invention to provide a cover for standard paints can will prevent paint which has collected in the annular ring and sealing groove during use from splashing or flowing down the outside of the paint can when the cover is installed on the paint can.

The invention is a resealable cover adapted to fit standard paint cans that prevents paint from splashing from the paint can when the paint can is recovered. The invention comprises inner sealing means for forcing most of the paint remaining in the paint can sealing groove to be returned back into the paint can. The inner sealing means is adapted to snap fit into the paint can sealing groove. Sealing flap means is provided for retaining within the paint can substantially all of any paint still remaining in the paint can annular ring and paint can sealing groove when said inner sealing means has been snap fit into the paint can sealing groove. Return relief means is provided for directing the paint back into the paint can when the paint is forced from the paint can sealing groove as a result of engagement by said inner sealing means. Lifting handle means is provided for bending said cover to temporarily break the seal between said cover and the paint can. Air release means is provided for forcing some of the air held in the paint can by said cover to the outside of said paint can which causes the inside air pressure of the paint can to be slightly less than the outside pressure therein resulting in said cover to be firmly held in place on the paint can.

BRIEF DESCRIPTION OF THE DRAWINGS

For a better understanding of the present invention, reference is made to the following detailed description of the preferred embodiment considered in conjunction with the accompanying drawings, in which.

DETAILED DESCRIPTION OF THE INVENTION

Figure 1:
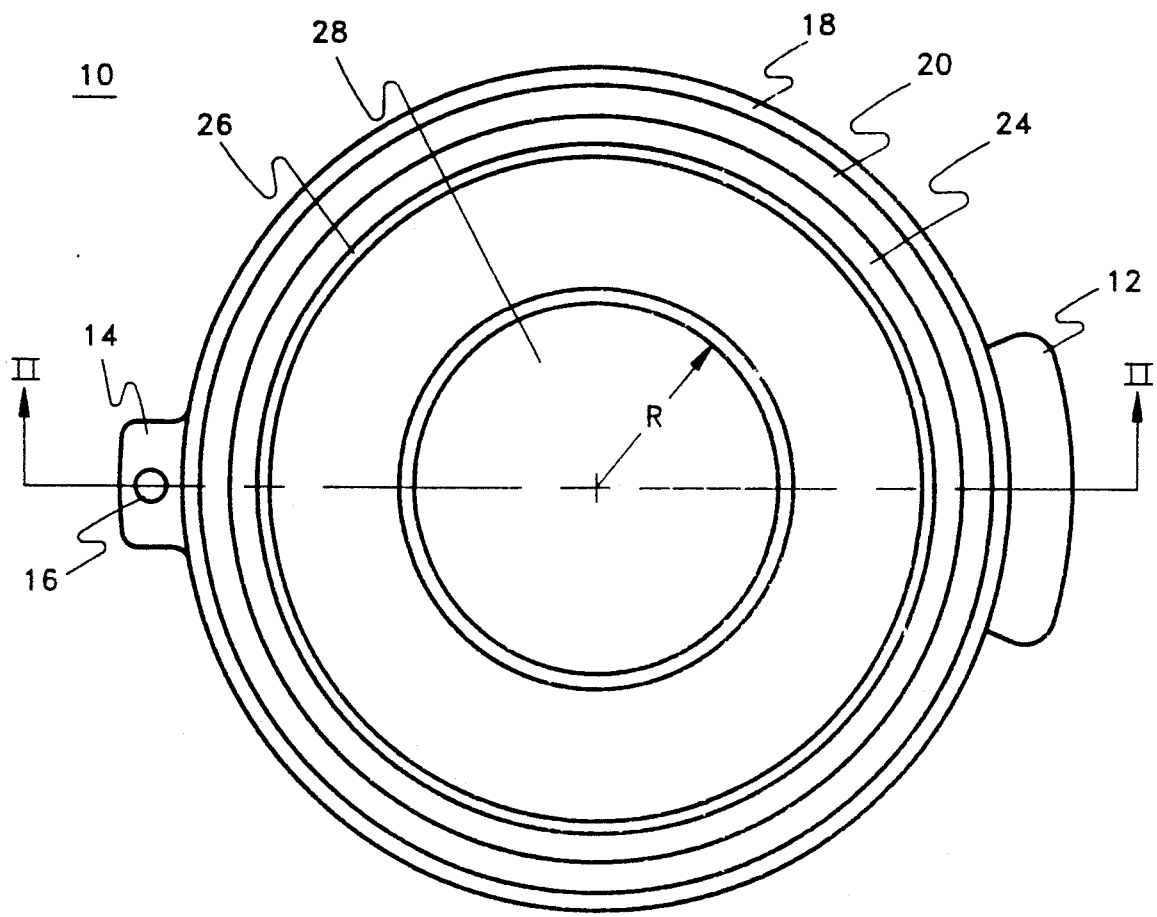
FIG. 1 is a bottom view of the anti-splash paint can cover according to the invention.

FIG. 1 is a bottom view of the anti-splash paint can cover according to the invention. The top surface of the cover (shown in FIG. 2) is planar. The bottom surface has concentric circular flanges and grooves on its bottom surface, with circular flanges extending generally normal thereto, each of said flanges extending downwardly relative to the paint can as shown.

The preferred measurements of the invention provided herein are for a cover that is adapted to fit the standard one gallon paint can. For other sizes, the measurements should be scaled accordingly.

Invention 10 is preferably molded from urethane plastic having a durometer rating adapted for the size of the can that it is to be covered. For example, the standard one gallon paint can requires a durometer of approximately 80 so that the cover is sufficiently rigid to snugly fit to the can, yet can be bent to release air or to be removed. Smaller sizes will require a durometer measurement that permits greater flexibility in the cover. Other plastics or materials such as rubber could be used provided that the strength, adhesives properties relative to paint, ease of fabrication, and cost compares favorably with the use of urethane.

Lifting handle 12 extends approximately ½ inch beyond the outer circumference and is approximately 2.5 inches long so that a sufficient surface is provided to lift the cover from the paint can without the use of tools such as a screwdriver. Opposite handle 12 is storage tab 14 which also extends about ½ from the outer circumference of the cover. Tab 14 is approximately ⅜ inches long and is provided with opening 16 which enables the cover to be hung on a hook or nail when not in use.

Flange 18, preferably having a thickness of approximately ⅛ overlaps the paint can and serves as means for sealing the paint from the outside, thereby keeping substantially all of the paint within the can, permitting only inconsequential amounts to flow over the outside surface of the paint can.

Adjacent to flange 18 is outer groove 20 and is approximately ¼ inch wide. Groove 20 is at the base of flange 18. Adjacent to groove 20 is inner sealing ring 24, adapted to fit into the paint can sealing groove. For a one gallon paint can, ring 24 should be approximately 3/16 inches wide.

Immediately adjacent to ring 24 is paint return relief area 26 which is a groove at the base of ring 24, approximately 5/32 inches wide.

At the center of the cover, having a radius R about 1.5 inches long, is air release area 28. Area 28 is compressed from the top surface during re-sealing the operator in order to force air from container to provide a tighter seal (colloquially referred to as "burping"). This process results in the air pressure in the can to be slightly less than ambient air pressure, thereby producing a positive pressure on the outside of the cover. Thus, the flexible cover firmly held onto the can. Prototype models of the cover produced by the inventor have shown that the cover will remain firmly in place even if a full one gallon paint is inverted and shaken.

Figure 2:
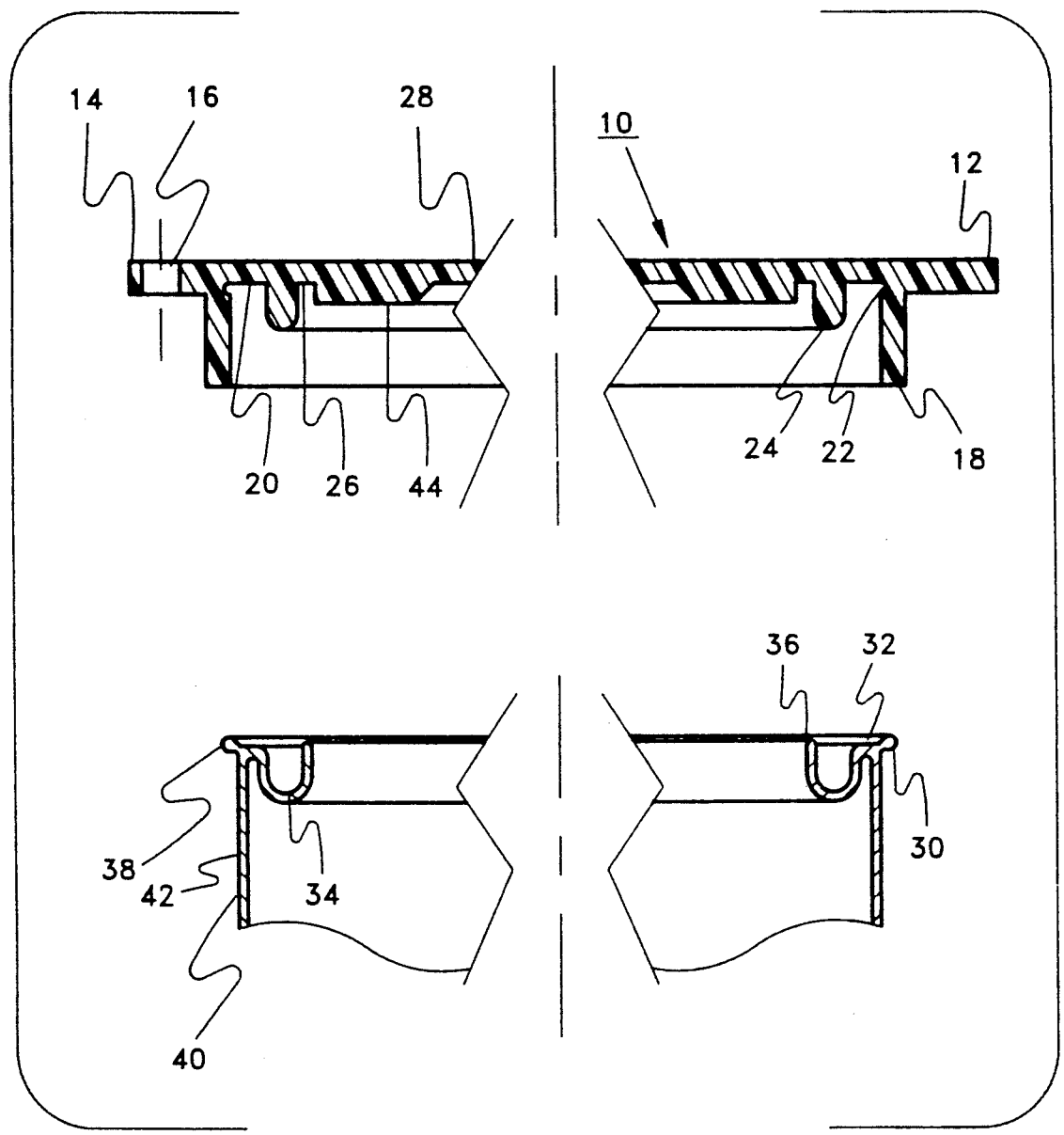
FIG. 2 is a cross-section view, taken along II—II of FIG. 1, of the anti-splash paint can cover according to the invention.

FIG. 2 is a cross-section view, taken along II—II of FIG. 1, of the anti-splash paint can cover according to the invention. Cover 10 is shown placed above a standard paint can 40 in position to re-cover can 40.

Lifting handle 12 and storage tab 14 is shown as preferable being about 3/16 inches thick. The thickness of the cover at outer groove 20, paint return relief area 26 and air release area 28 is approximately ⅛ inches. The thickness of the cover in area 44 is approximately ¼ inches. Again, all dimensions are based on a one gallon paint can cover using an 80 durometer urethane molded cover according to the invention. Other sizes and use of other materials would be scaled accordingly.

Flange 18 overlaps the outer surface 42 of can 40 by approximately 13/16 inches. The extra length of flange 18 ensures that can 40 is sealed off before inner sealing ring 24 engages the paint can sealing groove 34. Ring 24 is preferably 5/16 inches long and is tapered at the end to enable ring 24 to easily engage sealing groove 34 of can 40.

Rim bead groove 22 allows for clearance of the paint can rim bead 38 of the paint can outer sealing rim 30. Groove 22 is approximately 0.140 inches wide as measured from the base of groove 20 extending towards can 40. The outer diameter of groove 22 should be held to a close tolerance to ensure that the cover is firmly engaged to the can 40. Preferably this dimension should be approximately 6.61 inches plus or minus 0.010 inches. The full radius of groove 22 should correspond to the full radius of rim bead 38. Rim bead 38 extends beyond the outer surface 42 of paint can 40. This permits flange 18 to tightly fit around the outer surface 42 of paint can 40.

When inner sealing ring 24 engages inner sealing groove 34 of paint can 40, the paint which has collected in groove 34 is forced back into can 40 via paint return relief area 26. This recess extends inwardly beyond the inner sealing rim 36 of can 40 and thereby permits the paint to flow back into can 40.

Any paint that might be forced towards outer surface 42 of can 40 or paint that has collected in annular ring 32 is prevented from splashing or flowing over the outer surface 42 of can 40 by flange 18.

Once invention 10 is in place on can 40 and firmly sealed all the way down so that ring 24 is firmly engaged in sealing groove 34, lifting handle 12 is pulled up slightly while pressing down on air release area 28 to "burp" the cover. Enough air will be released from can 40 to cause a positive gradient to exist from the outside of the cover to the inside of the can. This ensures that a tight seal will be obtained without the necessity of pounding the cover with a hammer as is required when attempting to reseal standard metal paint can covers.

To remove cover 10, lifting handle 12 is pulled upwards to break the seal and cover 10 can easily be removed without the use of a screw driver or other instrument for prying. The same ease of removal is found regardless of the length of time that can 40 has been in storage.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An anti-splash paint can cover for re-sealing a standard metal paint can having a peripheral sealing rim, an annular ring adjacent to the sealing rim and a cover sealing groove interiorly adjacent to the annular ring, said paint can cover comprising:

a planar upper surface and a bottom surface;

peripherally positioned circular outer sealing flange means for retaining within the paint can, substantially all of any paint remaining in the paint can annular ring and paint can sealing groove, said outer sealing flange means attached to the bottom surface of said cover and extending generally normal thereto;

circular inner sealing flange means, spaced from and interiorly adjacent to said outer sealing flange means, for forcing most of the paint remaining in the paint can sealing groove back into the paint can, said inner sealing flange means adapted to snap fit into the paint can sealing groove, said inner sealing flange means attached to the bottom surface of said cover and extending generally normal thereto; and return relief means comprising an annular recess, interiorly adjacent to said inner sealing flange means, for directing the paint back into the paint can when the paint is forced from the paint can sealing groove as a result of engagement by said inner sealing flange means.

2. The cover of claim 1 further comprising:

lifting handle means, attached to the periphery of said cover, for bending said cover during removal of said cover from the paint can;

air release means, positioned within the center of said cover, for forcing some of the air held between the paint can and said cover to the outside of said paint can thereby causing the inside air pressure of the paint can to be slightly less than the outside pressure therein resulting in said cover being firmly held in place on the paint can.

3. The cover of claim 1 wherein said inner sealing flange means further comprises a tapered end adapted to facilitate engagement with a paint can sealing groove.

4. The cover of claim 1 wherein said outer sealing flange means is adapted in length to circumferentially extend around a side wall of a paint can, prior to engagement of a cover sealing groove by said inner sealing flange means, upon application of said cover to said paint can, thereby sealing substantially all of the paint inside the can, said outer sealing flange means having a diameter adapted so that said cover is firmly urged against the side wall of the paint can when said cover is in place on the paint can.

5. The cover of claim 1 wherein said cover is molded from urethane having a durometer value adapted to the size of the paint can to be covered.

6. The cover of claim 1 wherein said outer sealing flange means further comprises a rim bead groove adapted to receive the rim bead of the paint can.

7. The cover of claim 2 wherein said lifting handle means further comprises a flexible tab at the periphery of said cover that can remove said cover without the use of tools.

8. The cover of claim 2 wherein said air releases means further comprises a recess within the center of said cover that is easily depressed from the upper surface of said cover which forces air from the paint can.

9. The cover of claim 2 further comprising a storage tab having an opening adapted to hang said cover on a hook.

10. The cover of claim 2 wherein said inner sealing flange means further comprises a tapered end adapted to facilitate engagement with a paint can sealing groove.

11. The cover of claim 2 wherein said outer sealing flange means is adapted in length to circumferentially extend around a side wall of a paint can, prior to engagement of a cover sealing groove by said inner sealing flange means, upon application of said cover to said paint can, thereby sealing substantially all of the paint inside the can, said outer sealing flange means having a diameter adapted so that said cover is firmly urged against the side wall of the paint can when said cover is in place on the paint can.

12. The cover of claim 2 wherein said cover is molded from urethane having a durometer value adapted to the size of the paint can to be covered.

13. The cover of claim 2 wherein said outer sealing flange means further comprises a rim bead groove adapted to receive the rim bead of the paint can.

* * * * *